(12) United States Patent
Mukai et al.

(10) Patent No.: US 9,519,567 B2
(45) Date of Patent: Dec. 13, 2016

(54) DEVICE, METHOD OF GENERATING PERFORMANCE EVALUATION PROGRAM, AND RECORDING MEDIUM

(71) Applicant: FUJITSU LIMITED, Kawasaki-shi, Kanagawa (JP)

(72) Inventors: Yuta Mukai, Kawasaki (JP); Hideki Miwa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/338,659

(22) Filed: Jul. 23, 2014

(65) Prior Publication Data
US 2015/0089480 A1     Mar. 26, 2015

(30) Foreign Application Priority Data
Sep. 26, 2013   (JP) ................. 2013-200094

(51) Int. Cl.
*G06F 11/36*     (2006.01)
(52) U.S. Cl.
CPC .................. *G06F 11/3624* (2013.01)
(58) Field of Classification Search
None
See application file for complete search history.

(56) References Cited

U.S. PATENT DOCUMENTS

| | | | | |
|---|---|---|---|---|
| 5,481,708 A | * | 1/1996 | Kukol | 717/155 |
| 5,815,720 A | * | 9/1998 | Buzbee | 717/158 |
| 6,598,221 B1 | * | 7/2003 | Pegatoquet et al. | 717/152 |
| 6,922,829 B2 | * | 7/2005 | Ward et al. | 717/154 |
| 8,689,200 B1 | * | 4/2014 | Tallam | G06F 8/4435 717/151 |
| 8,910,124 B1 | * | 12/2014 | Bhansali | G06F 11/34 717/128 |

(Continued)

FOREIGN PATENT DOCUMENTS

| | | |
|---|---|---|
| JP | 62-169238 | 7/1987 |
| JP | 05-241915 | 9/1993 |

(Continued)

OTHER PUBLICATIONS

"Profiling an Application." QNX Software Systems. N.p., Jun. 1, 2010. Web. Oct. 29, 2014. <http://web.archive.org/web/20100601022136/http://www.qnx.com/developers/docs/6.4.1/ide_en/user_guide/profiler.html>.*

(Continued)

*Primary Examiner* — Wei Zhen
*Assistant Examiner* — Binh Luu
(74) *Attorney, Agent, or Firm* — Staas & Halsey LLP

(57) ABSTRACT

A device for generating a performance evaluation program includes: a memory; and a processor coupled to the memory. The processor is configured to: analyze a source code of a target program that is subject to performance evaluation, translate the source code into a binary code based on an analysis result of the source code while generating execution binary that has an evaluation area to be used in the performance evaluation at a target location corresponding to a candidate location of the target program, and write an evaluation code in the evaluation area of the execution binary to evaluate performance of the target program based on an evaluation item and the target location of the target program.

20 Claims, 12 Drawing Sheets

(56) References Cited

U.S. PATENT DOCUMENTS

| | | | |
|---|---|---|---|
| 2002/0144245 A1* | 10/2002 | Lueh .................... | G06F 8/41 |
| | | | 717/140 |
| 2003/0237080 A1* | 12/2003 | Thompson ............ | G06F 8/441 |
| | | | 717/161 |
| 2005/0071830 A1* | 3/2005 | Naveh ................. | G06F 9/3836 |
| | | | 717/151 |
| 2005/0251795 A1* | 11/2005 | Fernandez ............ | G06F 8/4441 |
| | | | 717/151 |
| 2008/0250399 A1* | 10/2008 | Huang et al. ................ | 717/151 |
| 2012/0054722 A1* | 3/2012 | Takeda et al. ................ | 717/128 |

FOREIGN PATENT DOCUMENTS

| | | |
|---|---|---|
| JP | 11-242614 | 9/1999 |
| JP | 2011-159084 | 8/2011 |

OTHER PUBLICATIONS

Thiel, Justin. "An Overview of Software Performance Analysis Tools and Techniques: From GProf to DTrace." wustl.edu. N.p., Feb. 29, 2008. Web. Jun. 12, 2015. <http://web.archive.org/web/20080229001224/http://www.cse.wustl.edu/~jain/cse567-06/ftp/sw_monitors1/>.*

Rouse, Margaret. "no op (no operation)." WhatIs.com. TechTarget, Mar. 2011. Web. Dec. 10, 2015. <http://whatis.techtarget.com/definition/no-op-no-operation>.*

* cited by examiner

FIG. 2

```
int FunctionA(int a, int b) {
  int c = a+b;
  return c;
} int FunctionB(int a) {
  int b = FunctionA(a, 10);
  int c = 0;
  for (int i = 0; i < b; i++) {
    c += i;
  }
  return c;
}
```

FIG. 3

```
int FunctionA(int a,int b) {
FunctionA LOCATION IN WHICH EVALUATION AREA THAT CORRESPONDS TO Function A START IS OBTAINED
int c = a+b;
FunctionA LOCATION IN WHICH EVALUATION AREA THAT CORRESPONDS TO Function A TERMINATION IS OBTAINED
return c;
} int FunctionB(int a) {
FunctionB LOCATION IN WHICH EVALUATION AREA THAT CORRESPONDS TO Function B START IS OBTAINED
int b = FunctionA(a,10);
int c = 0;
FunctionB LOCATION IN WHICH EVALUATION AREA THAT CORRESPONDS TO Function B LOOP NUMBER 1 START IS OBTAINED
for (int i = 0;i<b;i++){
c +=i;
}FunctionB LOCATION IN WHICH EVALUATION AREA THAT CORRESPONDS TO Function B LOOP NUMBER 1 TERMINATION IS OBTAINED
c *=2;
FunctionB LOCATION IN WHICH EVALUATION AREA THAT CORRESPONDS TO Function B TERMINATION IS OBTAINED
rerurun c;
}
```

FIG. 4

```
        EXECUTION BINARY
ADDRESS
...
 1000   INSTRUCTION A
 1008   INSTRUCTION B
 1010   NOP
 1018   INSTRUCTION C
 1020   INSTRUCTION D
 1028   NOP
 1030   INSTRUCTION E
 1038   INSTRUCTION F
...
```

FIG. 5

| ADDRESS | INSERTION LOCATION |
|---|---|
| 1230 | Function A START SECTION |
| 1258 | Function A TERMINATION SECTION |

FIG. 6

| TARGET LOCATION | EVALUATION ITEM |
|---|---|
| FunctionA | EXECUTION TIME |
| FunctionB, FIRST LOOP | NUMBER OF EXECUTIONS |

FIG. 7

```
EXECUTION BINARY AFTER EVALUATION CODE IS WRITTEN
ADDRESS
...
 1000   INSTRUCTION A
 1008   INSTRUCTION B
 1010   EVALUATION CODE
 1018   INSTRUCTION C
 1020   INSTRUCTION D
 1028   NOP
 1030   INSTRUCTION E
 1038   INSTRUCTION F
...
```

1

DEVICE, METHOD OF GENERATING PERFORMANCE EVALUATION PROGRAM, AND RECORDING MEDIUM

CROSS-REFERENCE TO RELATED APPLICATION

This application is based upon and claims the benefit of priority of the prior Japanese Patent Application No. 2013-200094, filed on Sep. 26, 2013, the entire contents of which are incorporated herein by reference.

FIELD

The embodiments discussed herein are related to a device for generating a performance evaluation program, a method of generating a performance evaluation program, and a recording medium.

BACKGROUND

When performance of a computer program is evaluated, especially in the purpose of tuning, it is important to evaluate the performance in a unit of function or a unit of loop. To that end, for example, at the execution of a target program that is subject to a performance evaluation, a start time and a termination time of a function or loop processing are recorded, and a time that is taken for execution of the function or the loop is obtained based on a time difference between the start time and the termination time. For example, by inserting an evaluation code that calculates the time difference into a start location and a termination location of the function or the loop processing in the target program, the time that is taken for the execution of the function or the loop is obtained.

When the evaluation code is inserted into the target program that is subject to a performance evaluation as described above, two points are requested as follows. The first point is that an influence on normal execution of the program is small when the evaluation code is inserted into the program to be evaluated. For example, when an execution time of the program is increased due to the insertion of the evaluation code, problems occur that accurate evaluation of a target location is not executed, or the execution time of the whole program is extended.

The second point is that, even when a location or item to be evaluated is changed, evaluation of the program may be executed quickly and flexibly using the changed contents. The location or item to be evaluated are often changed by trial and error, and it takes a long time to execute processing of modifying and re-translating the evaluation code that has been inserted into the source code of the target program each time the location or item to be evaluated is changed.

In addition, an electronic device has been proposed by which execution speed of a program is not significantly reduced at the time of normal execution in which debug processing is not executed even when the debug processing is kept to be included in the program. The electronic device loads a debug instruction code in the program into a random access memory (RAM) while rewriting the debug instruction code into a NOP instruction code when the electronic device normally executes the program including the debug instruction code. In addition, a method of automatically inserting an evaluation code into a target program that is to be evaluated has been proposed.

As an example of the related art, Japanese Laid-open Patent Publication No. 2011-159084, Japanese Laid-open Patent Publication No. 62-169238 (corresponding to Japanese Examined Patent Application Publication No. 8-1608), Japanese Laid-open Patent Publication No. 5-241915, and Japanese Laid-open Patent Publication No. 11-242614 are known.

SUMMARY

According to an aspect of the invention, a device for generating a performance evaluation program includes: a memory; and a processor coupled to the memory. The processor is configured to: analyze a source code of a target program that is subject to performance evaluation, translate the source code into a binary code based on an analysis result of the source code while generating execution binary that has an evaluation area to be used in the performance evaluation at a target location corresponding to a candidate location of the target program, and write an evaluation code in the evaluation area of the execution binary to evaluate performance of the target program based on an evaluation item and the target location of the target program.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a diagram illustrating an example of a source code;

FIG. 3 is a diagram illustrating an example of locations serving as evaluation areas, which are represented at a source code level, into which evaluation codes are inserted;

FIG. 4 is a diagram illustrating an example of execution binary in which an evaluation area is obtained;

FIG. 5 is a diagram illustrating an example of a location information file of an evaluation area;

FIG. 6 is a diagram illustrating an example of the evaluation instruction file;

FIG. 7 is a diagram illustrating an example of the execution binary after an evaluation code is written;

DESCRIPTION OF EMBODIMENTS

In the second point that is requested for the above-described performance evaluation of the program, it is conceivable that change in the location or item to be evaluated is assumed, and an evaluation code is inserted into the program from the beginning so that a lot of locations and items may be evaluated. However, in this case, an execution time of the whole program is increased, and the condition of the first point that is requested for the above-described performance evaluation of the program is not satisfied. As described above, it is difficult to satisfy the conditions of the above-described two points at the same time, and an influence on normal execution of the program is increased when the number of locations or the number of items to be evaluated are increased.

In addition, it is also conceivable that, in the related art in which the debug instruction code is rewritten into a NOP instruction code, the debug instruction code is replaced with an evaluation code to be applied to the performance evaluation of the program, and the evaluation code is set so that a lot of locations and items may be evaluated from the beginning.

However, in the related art in which the debug instruction code is rewritten into the NOP instruction, at the time of normal execution, all debug instruction codes are rewritten into NOP instructions. Therefore, even when the related art is applied, it is difficult to deal with change in a location or item to be evaluated quickly and flexibly.

In the technology discussed herein, as an embodiment, an influence on normal execution of a program is suppressed, and even when a location or item to be evaluated is changed, evaluation of the program is executed quickly and flexibly using the changed contents.

The embodiments of the technology discussed herein are described in detail below with reference to drawings.

Figure 1:
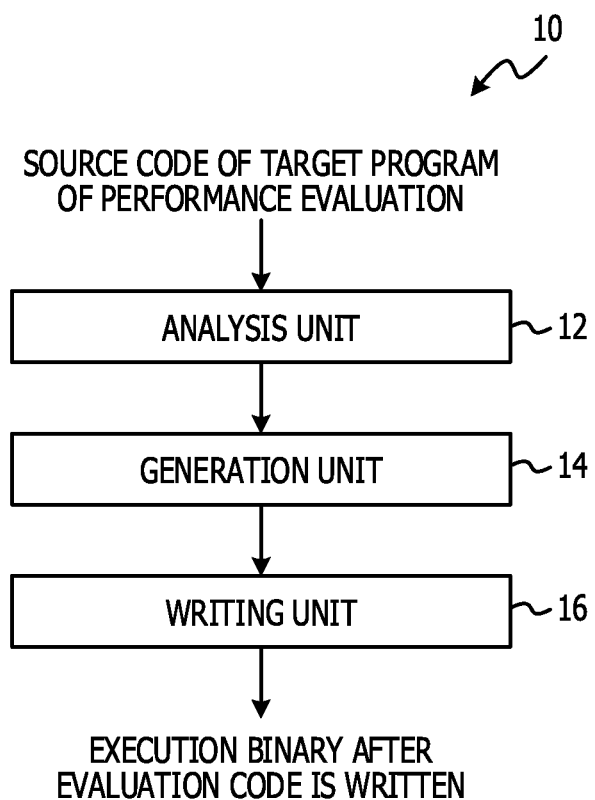
FIG. 1 is a diagram illustrating a schematic structure of a performance evaluation program generation device according to an embodiment.

As illustrated in FIG. 1, to a performance evaluation program generation device 10 according to an embodiment, for example, a source code of a program that is a target of performance evaluation, which is illustrated in FIG. 2, is input. The performance evaluation program generation device 10 generates execution binary in which an evaluation code that is used to evaluate performance is written and outputs the execution binary. The performance evaluation program generation device 10 includes an analysis unit 12, a generation unit 14, and a writing unit 16.

The analysis unit 12 executes syntactic analysis of a loop structure, call of a function, branch of processing, and the like, on the input source code of the target program. In addition, the analysis unit 12 executes optimization for translation from the source code to a binary code based on the result of the syntactic analysis. For the processing of the analysis unit 12, a known method may be used.

The generation unit 14 translates the source code of the target program into a binary code based on the result of the analysis and optimization by the analysis unit 12, and generates execution binary in which an evaluation area is obtained in a location that corresponds to a candidate of a target location of performance evaluation in the target program.

For example, the generation unit 14 detects the location in which the evaluation area is obtained, based on the result of the analysis and optimization by the analysis unit 12. The location in which the evaluation area is obtained is a location corresponding to a target location that may be an evaluation target of a function, loop processing, or the like. In the target location, all functions and pieces of loop processing may be considered as targets, or merely a function or loop processing that is determined beforehand may be considered as a target. The corresponding location may be at least one of locations before and after the candidate of the target location, in accordance with an evaluation item. FIG. 3 is a diagram illustrating an example of locations of evaluation areas detected by the generation unit 14, which are represented at a source code level, into which evaluation codes are inserted. In the example of FIG. 3, locations of the evaluation areas are obtained before and after a function and a loop.

The generation unit 14 obtains an evaluation area in the detected location to be used to obtain the evaluation area, and translates a source code of the target program into a binary code to generate execution binary. The generation unit 14 sets the size of an obtained evaluation area as the maximum size or more of the assumed evaluation code. That is, the size that is enough to execute writing of an instruction sequence of the evaluation code is obtained. As a result, in the writing unit 16 that is described later, for any evaluation item, an evaluation code that measures the evaluation item may be written in the evaluation area. In addition, when the size of the evaluation area is set to be identical to the maximum size of the assumed evaluation code, obtaining of an evaluation area that is not desired may be suppressed.

The generation unit 14 may obtain an evaluation area so as to arrange a NOP instruction. By obtaining an evaluation area using a NOP instruction, when writing of an evaluation code is executed in the writing unit 16 that is described later, a NOP instruction may not be written in a location that is not an evaluation target, again. In addition, "arrangement of a NOP instruction" is writing of NOP instructions the number of which corresponds to the size of an evaluation area in a location in execution binary that corresponds to a location detected as the location in which the evaluation area is obtained.

In addition, the generation unit 14 obtains an evaluation area based on the optimization result by the analysis unit 12, that is, after optimization. For example, if an evaluation area (here, NOP instruction) is obtained before optimization, an evaluation area is also optimized at the time of optimization undesirably, which affects determination whether or not inline expansion is executed depending on the number of instructions of the function. In the embodiment, it may be suppressed that the optimization is affected by obtaining of an evaluation area as compared with the case in which an evaluation area is obtained before optimization.

In addition, as the result of the optimization, one piece of loop processing at the source code level may be converted into a plurality pieces of loop processing at the binary code level. In such a case, the generation unit 14 obtains an evaluation area in a location corresponding to each of the plurality of pieces of converted loop processing. When an evaluation area is obtained before optimization, an evaluation area corresponding to each of the plurality of pieces of converted loop processing is not obtained because it is difficult to grasp that how the loop processing is converted by the optimization. In the embodiment, an evaluation area is obtained after optimization, so that the evaluation area may be obtained for each candidate of the target location of evaluation at the binary code level.

FIG. 4 is a diagram illustrating an example of execution binary generated by the generation unit 14 and in which an evaluation area is obtained. In the example of FIG. 4, an address range in which a NOP instruction is written is an evaluation area that is obtained by the generation unit 14.

In addition, the generation unit 14 generates a location information file that is related to the obtained evaluation area and outputs the generated location information file. The location information file indicates a correspondence relationship between an address of the obtained evaluation area and a location in which the evaluation area that has been detected at the source code level is obtained, that is, an insertion location of the evaluation area. As described above, the generation unit 14 obtains, using a function and a loop as a candidate of the target location of evaluation, an evaluation area that corresponds to the candidate. Thus, the evaluation area has a correspondence relationship with the type of the function and loop, and the location information file indicates such a correspondence relationship. In addition, for example, in a case or the like in which the type of loop processing to be executed is different depending on the number of the times of the loop processing, the generation unit 14 may add a condition under which the loop processing is executed, to the location information file in order to distinguish the type of the loop processing. In addition, additional information to be used to distinguish the type of the function and the loop processing may be added to the location information file.

When the writing unit 16 accepts an evaluation instruction file that is specified by the user, the writing unit 16 writes an evaluation code in an evaluation area in the execution binary that is generated in the generation unit 14 in accordance with the evaluation instruction file. For example, as illustrated in FIG. 6, in the evaluation instruction file, a target location of performance evaluation for the target program is described by a function name or a loop name at the source code level. In addition, in the evaluation instruction file, an evaluation item is described that indicates executed evaluation for the described target location.

For example, the writing unit 16 extracts an address of the evaluation area that is obtained so as to correspond to the target location that is indicated by the evaluation instruction file, from the location information file. In addition, in the execution binary generated by the generation unit 14, the writing unit 16 writes an evaluation code that corresponds to the evaluation item indicated by the evaluation instruction file, in an evaluation area that starts from the extracted address.

More specifically, a case in which writing of an evaluation code corresponding to the first line of the evaluation instruction file is executed is described as an example using the location information file illustrated in FIG. 5 and the evaluation instruction file illustrated in FIG. 6. Here, a target location indicated by the evaluation instruction file is "Function A". Therefore, the writing unit 16 extracts an address "1230" in which the insertion location is "Function A start section", and an address "1258" in which the insertion location is "Function A termination section", from the location information file. In addition, an evaluation item of "Function A" indicated by the evaluation instruction file is "execution time". Therefore, the writing unit 16 writes an evaluation code to be used to record a start time, in an evaluation area that starts from the address "1230" of the execution binary. In addition, the writing unit 16 calculates a time difference between a start time and a termination time (current time) and writes an evaluation code to be used to record the calculated time difference, in an evaluation area that starts from the address "1258" of the execution binary.

By executing the above-described writing of an evaluation code on each of the lines described in the evaluation instruction file, the writing unit 16 generates execution binary after the evaluation code is written. In addition, when the writing unit 16 accepts change in the evaluation instruction file, the writing unit 16 rewrites the evaluation code in accordance with the changed target location and evaluation item. As described above, even when the evaluation instruction file is changed, writing of the evaluation code in the evaluation area obtained by the execution binary may be merely changed. In addition, the evaluation area is obtained so as to have a size that is the maximum size of the assumed evaluation code or more, so that the evaluation area may be compatible with any evaluation code even when the evaluation code is changed. Thus, a source code is not desired to be modified and re-translated into a binary code as compared with a case in which an evaluation code is inserted into a source code, and the writing unit 16 may handle with change in the evaluation instruction file quickly and flexibly.

FIG. 7 is a diagram illustrating an example of execution binary after an evaluation code is written. In the example of FIG. 7, a location of "NOP" is obtained as an evaluation area, but indicates a location in which an evaluation code is not written, that is, a location that is not a current evaluation target. A target program is executed based on the execution binary after the evaluation code is written, and performance evaluation of the target program may be executed.

Figure 8:
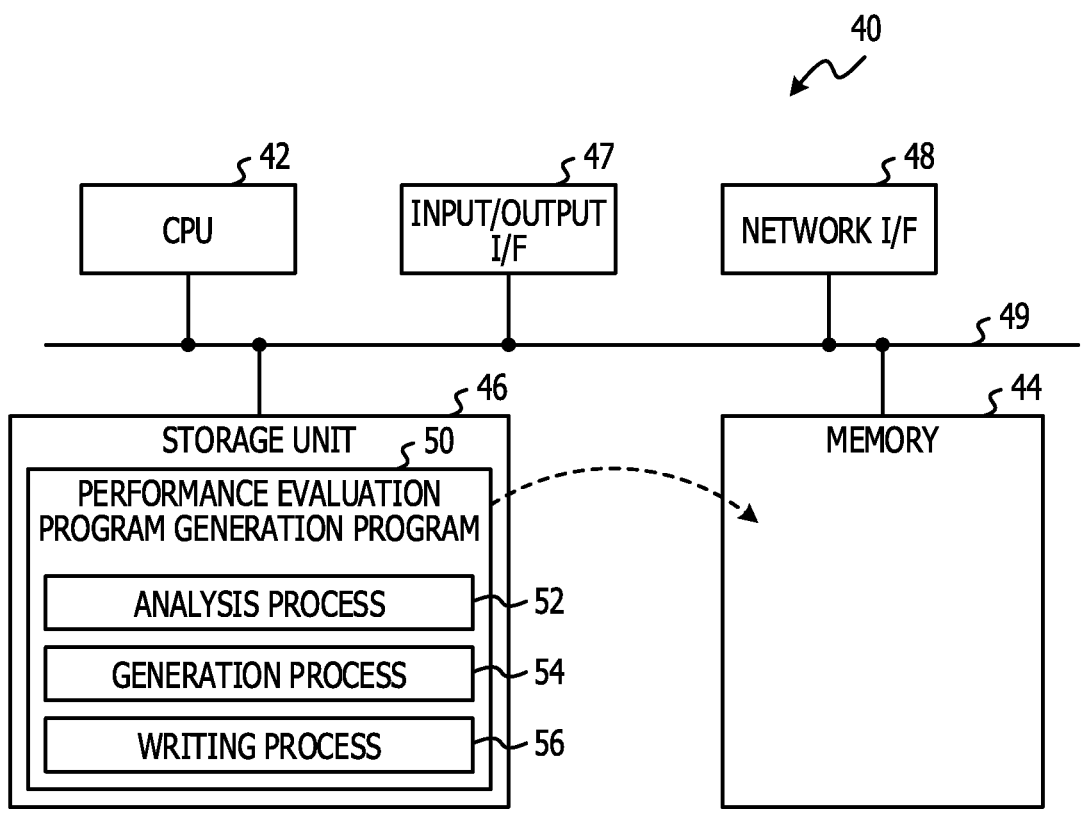
FIG. 8 is a diagram illustrating a schematic structure of a computer that operates as the performance evaluation program generation device.

The performance evaluation program generation device 10 may be obtained, for example, by a computer 40 illustrated in FIG. 8. The computer 40 includes a central processing unit (CPU) 42, a memory 44, a non-volatile storage unit 46, an input/output interface (I/F) 47, and a network I/F 48. The CPU 42, the memory 44, the storage unit 46, the input/output I/F 47, and the network I/F 48 are coupled to each other through a bus 49.

The storage unit 46 may be obtained by a hard disk drive (HDD), a flash memory, or the like. In the storage unit 46 as a storage medium, a performance evaluation program generation program 50 that causes the computer 40 to operate as the performance evaluation program generation device 10 is stored. The CPU 42 reads the performance evaluation program generation program 50 from the storage unit 46 and loads the performance evaluation program generation program 50 from the memory 44, and executes processes that are included in the performance evaluation program generation program 50 sequentially.

The performance evaluation program generation program 50 includes an analysis process 52, a generation process 54, and a writing process 56. The CPU 42 operates as the analysis unit 12 illustrated in FIG. 1 by executing the analysis process 52. In addition, the CPU 42 operates as the generation unit 14 illustrated in FIG. 1 by executing the generation process 54. In addition, the CPU 42 operates as the writing unit 16 illustrated in FIG. 1 by executing the writing process 56. As a result, the computer 40 executing the performance evaluation program generation program 50 operates as the performance evaluation program generation device 10.

The performance evaluation program generation device 10 may be obtained, for example, by a semiconductor integrated circuit, and more specifically, an application specific integrated circuit (ASIC) and the like.

An effect of the performance evaluation program generation device 10 according to the embodiment is described below. When a source code of a program that is a target of performance evaluation is input to the performance evaluation program generation device 10, performance evaluation program generation processing illustrated in FIG. 9 is executed in the performance evaluation program generation device 10.

Figure 9:
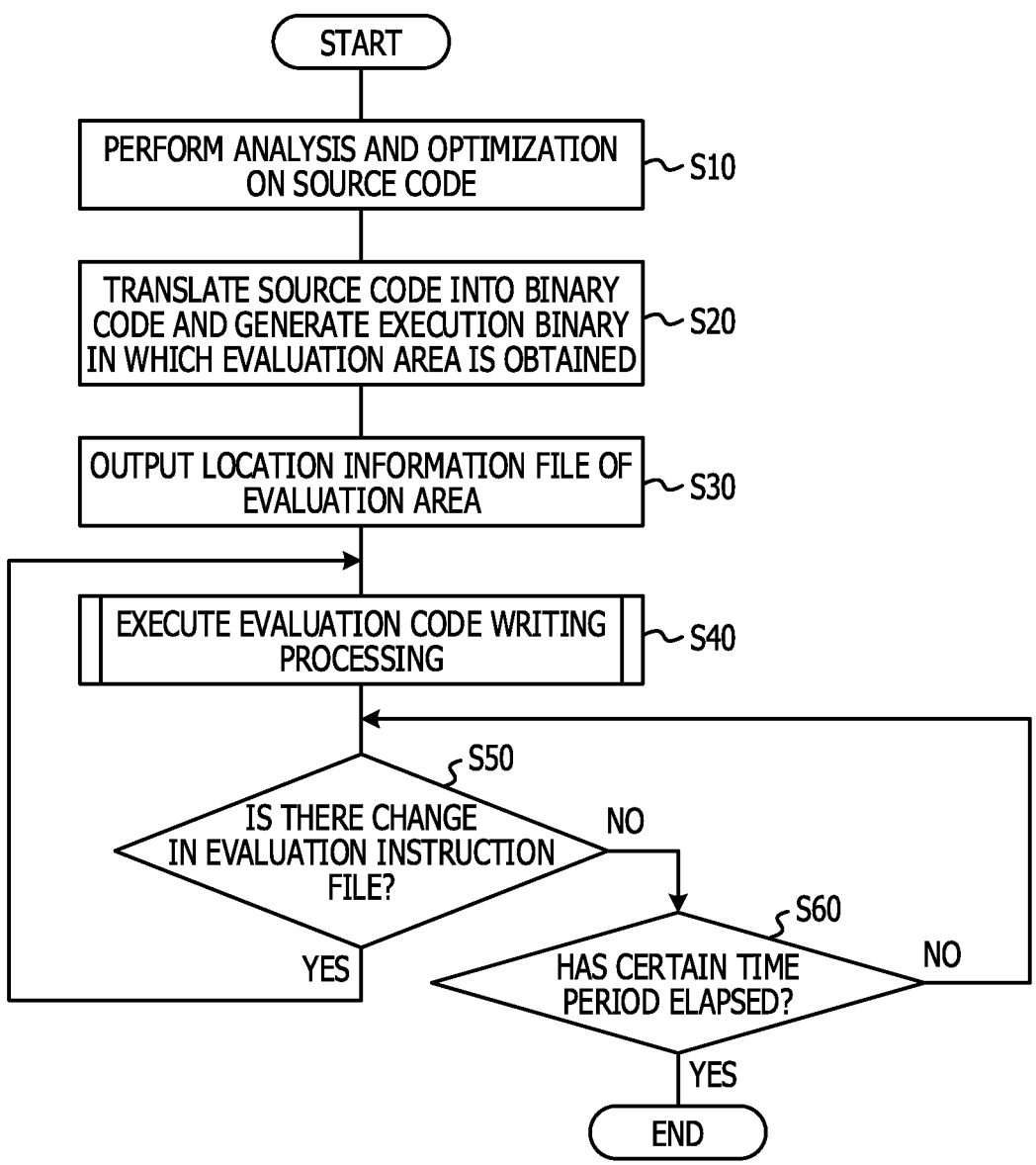
FIG. 9 is a flowchart illustrating performance evaluation program generation processing.

In Step S10 of the performance evaluation program generation processing illustrated in FIG. 9, the analysis unit 12 executes syntactic analysis of a loop structure, call of a function, branch of processing, and the like, on the input source code of the target program. In addition, the analysis unit 12 executes optimization for translation from the source code into a binary code based on the syntactic result.

In Step S20, the generation unit 14 translates the source code of the target program into a binary code based on the result of the analysis and optimization by the analysis unit 12, and generates execution binary. At that time, the generation unit 14 generates the execution binary in which an evaluation area is obtained in a location corresponding to a candidate of the target location of performance evaluation in the target program.

In Step S30, the generation unit 14 generates a location information file that is related to the obtained evaluation area and outputs the generated location information file.

Figure 10:
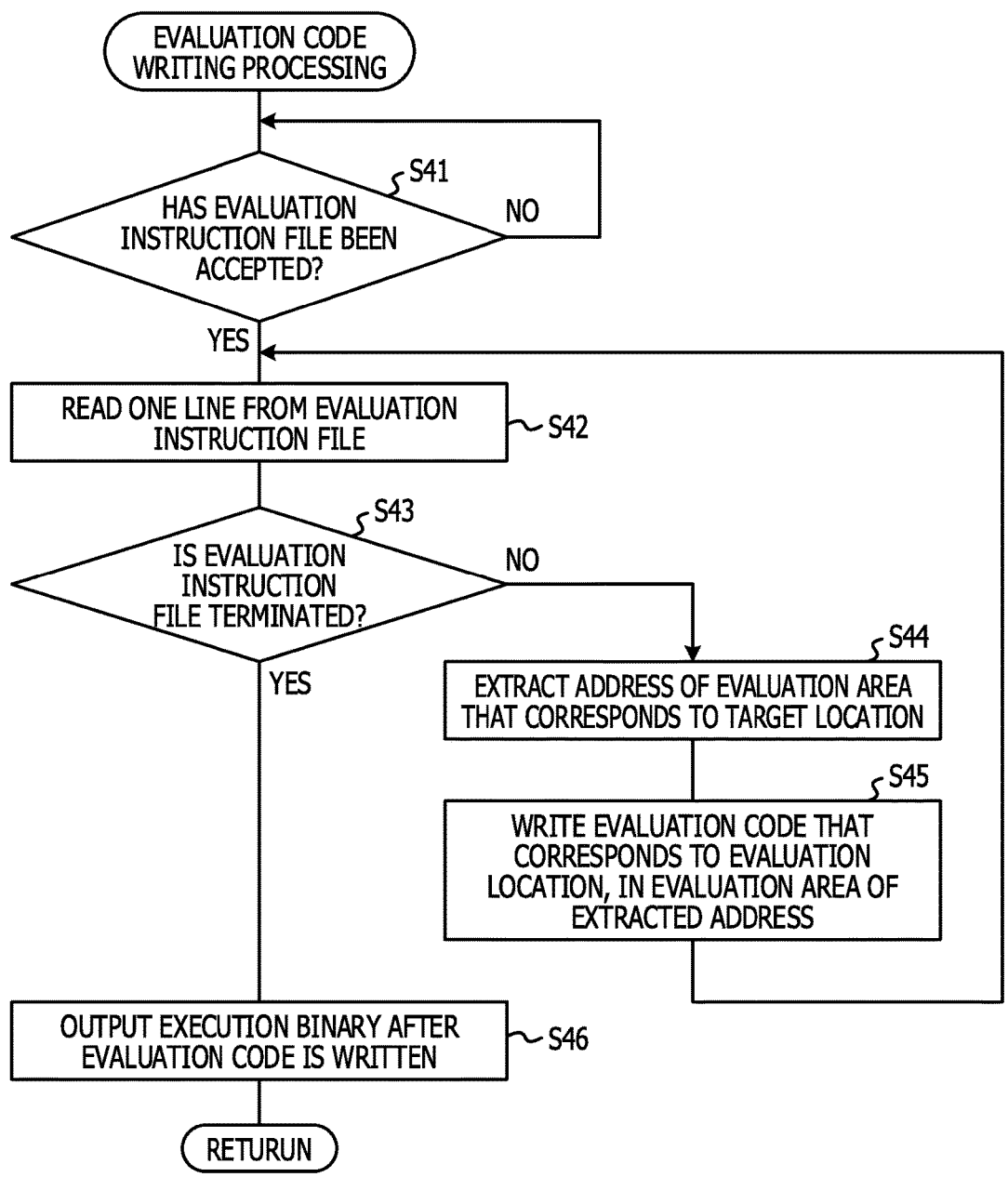
FIG. 10 is a flowchart illustrating evaluation code writing processing.

In Step S40, the writing unit 16 executes evaluation code writing processing illustrated in FIG. 10.

In Step S41 of the evaluation code writing processing illustrated in FIG. 10, the writing unit 16 determines whether or not an evaluation instruction file that is specified by a user has been accepted. When the writing unit 16 determines that an evaluation instruction file has been accepted, the flow proceeds to Step S42, and when the writing unit 16 determines that an evaluation instruction file has not been accepted, the determination of S42 is repeated.

In Step S42, the writing unit 16 reads one line from the accepted evaluation instruction file. Then, in Step S43, the writing unit 16 determines whether or not the evaluation instruction file is terminated. When the writing unit 16 determines that the evaluation instruction file is terminated, the flow proceeds to Step S46, and when the writing unit 16 determines that the evaluation instruction file is not terminated, the flow proceeds to Step S44.

In Step S44, the writing unit 16 extracts an address of an evaluation area that is obtained so as to correspond to a function name or a loop name that is indicated by the target location of the read line, from the location information file. In Step S45, the writing unit 16 writes an evaluation code that corresponds to an evaluation item indicated by the evaluation instruction file in an evaluation area that starts from the above-described address having been extracted in Step S44, in the above-described execution binary that has been generated in Step S20. In addition, the flow returns to Step S42, and the writing unit 16 reads one line that is not processed yet, from the evaluation instruction file, and the processing of Steps S42 to S45 is repeated.

In Step S46, the writing unit 16 outputs the generated execution binary after the evaluation code is written, and the flow returns to the performance evaluation program generation processing illustrated in FIG. 9.

As a result, the target program is executed based on the execution binary after the evaluation code is written. In the execution of the target program, by executing an instruction indicated by the evaluation code that is written in the execution binary, information in accordance with the evaluation item is recorded to a certain storage area. The user may evaluate performance of the target program based on the recorded information. In addition, there is a case in which the user desires to change a target location or an evaluation item of evaluation and evaluate the performance again after the user has checked the recorded information. In this case, the user rewrites the evaluation instruction file, and inputs the rewritten evaluation instruction file to the performance evaluation program generation device 10.

In Step S50 of the performance evaluation program generation processing illustrated in FIG. 9, the writing unit 16 determines whether or not the changed evaluation instruction file has been accepted. When the writing unit 16 determines that the changed evaluation instruction file has been accepted, the flow returns to Step S40. As a result, the execution binary after the evaluation code is written, which corresponds to the changed evaluation instruction file, is generated without re-translation. On the other hand, the writing unit 16 determines that the changed evaluation instruction file has not been accepted, the flow proceeds to Step S60, and the writing unit 16 determines whether or not a certain time period has elapsed. When the writing unit 16 determines that the certain time period has not elapsed, the flow returns to Step S50, and when the writing unit 16 determines the certain time period has elapsed, the performance evaluation program generation processing ends.

Here, an operation is described in which a target program is executed based on the execution binary after the evaluation code is written, which is generated by the performance evaluation program generation device 10 according to the embodiment.

In the target program, similar to execution of a regular program, in order from an instruction that is described in the head of the execution binary, the execution is performed. In the case of a NOP instruction, the flow proceeds to execution of a next instruction without any execution in particular.

An operation is described below with reference to FIG. 11, in which an instruction indicated by an evaluation code that is written in an evaluation area obtained before a certain function (hereinafter may be referred to as "start section") when an execution time of the certain function is evaluated. In addition, an operation is described below with reference to FIG. 12, in which an instruction indicated by an evaluation code that is written in an evaluation area obtained after the certain function (hereinafter may be referred to as "termination section"). Each piece of processing is executed by the CPU of the computer on which the target program operates.

Figure 11A:
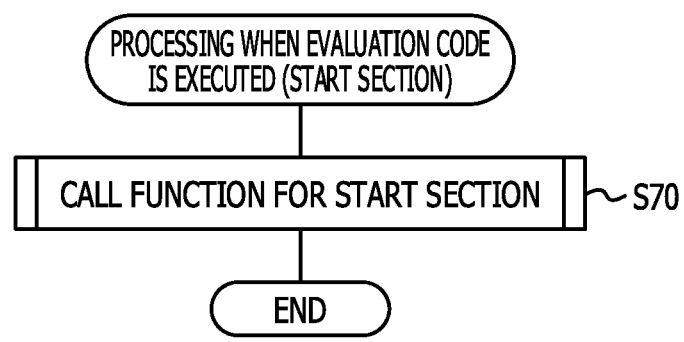
FIG. 11A is a flowchart illustrating processing at the time of execution of an evaluation code (start section)
Figure 11B:
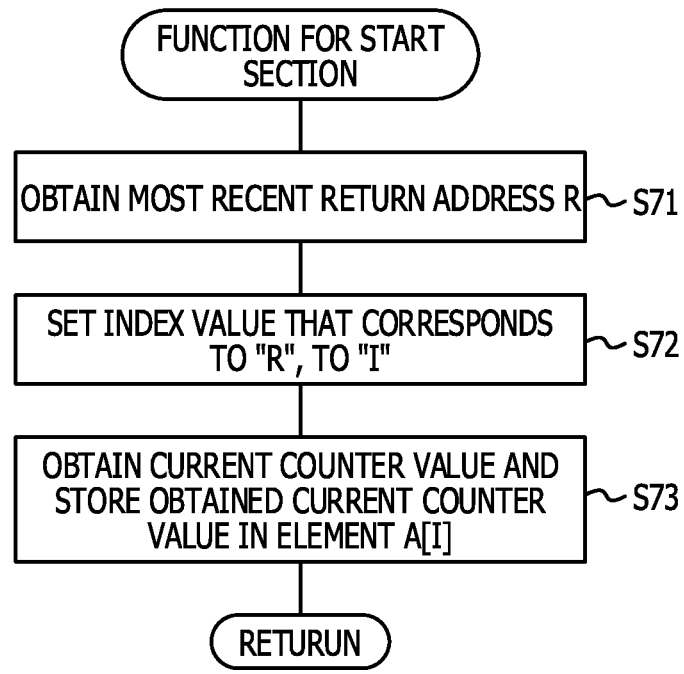
FIG. 11B is a flowchart illustrating a function for the start section.

In Step S70 of FIG. 11A, the CPU calls a function for the start section. In the function for the start section, in Step S71 of FIG. 11B, the CPU obtains a most recent return address R. The return address is an address of an instruction by which a function call is executed most recently, that is, here, an address in which an evaluation code that is used to call the function for the start section is written. In Step S72, the CPU sets an index value that corresponds to "R", to "I". In Step S73, the CPU obtains a current counter value of a certain counter, and stores the obtained current counter value in an element A[I] of an index that corresponds to "R" of an array A, and the flow returns to the processing of the target program.

Figure 12A:
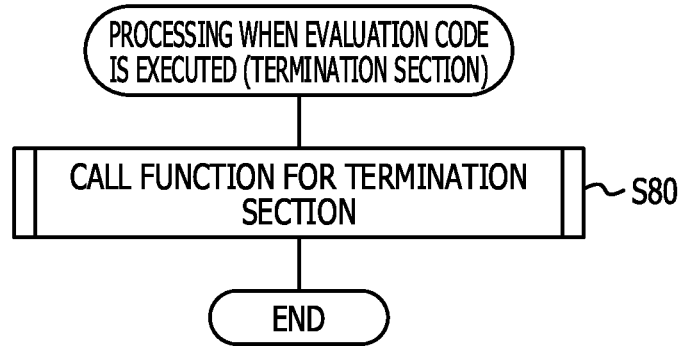
FIG. 12A is a flowchart illustrating processing at the time of execution of an evaluation code (termination section)
Figure 12B:
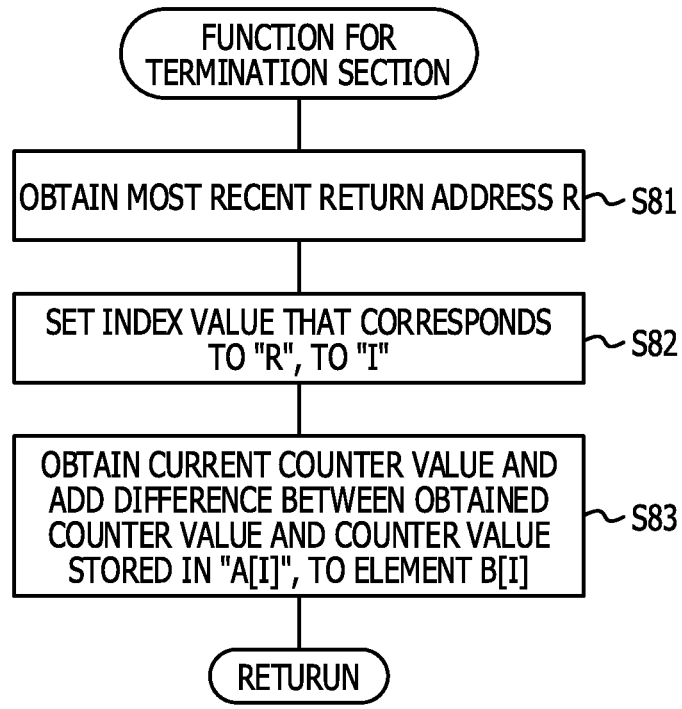
FIG. 12B is a flowchart illustrating a function for the termination section.

In Step S80 of FIG. 12A, the CPU calls a function for the termination section. In the function for the termination section, in Step S81 of FIG. 12B, the CPU obtains a most recent return address R. In Step S82, the CPU sets an index value that corresponds to "R", to "I". In Step S83, the CPU obtains the current counter value of the counter that is used in Step S73 of FIG. 11B. In addition, the CPU adds a difference between the obtained counter value and the counter value that is stored in "A[I]", to an element B[I] of an index corresponding to "R" of the array B, and the flow returns to the processing of the target program.

It is assumed that indexes of the array A and the array B have the same value, which respectively correspond to a return address called from an evaluation code of a start section of a certain target location and a return address called from an evaluation code of a termination section corresponding to the start section. In addition, the counter is, for example, a processor specific hardware counter that records a Unix (registered trademark) time in which a value is increased by one each time one second elapses, the number of clocks, and the number of executed instructions. It is assumed that a time that is taken to execute a target portion is stored for each of the locations in the array B when the Unix (registered trademark) time is selected for a counter to be obtained. A return address corresponding to the array B corresponds to an address of an instruction that is called from the evaluation code of the termination section, so that a function or loop that corresponds to a value stored in "B[I]" may be determined by referring to the location information file of the evaluation area.

Thus, the function name or the loop name is associated with an index of an array B, so that the evaluation result may be obtained for each function or loop that is an evaluation target after execution termination of the target program. In addition, when such an algorithm is used, an argument is not desired for an evaluation function regardless of an evaluation item, so that it is assumed that the size of an evaluation area is the same size as an instruction sequence that calls a function having no argument once.

As described above, in the performance evaluation program generation device 10 according to the embodiment, a source code of a target program is translated into a binary code, and an evaluation area is obtained in a location corresponding to a candidate of a target location of evaluation. In addition, an evaluation code corresponding to an evaluation item is written in the evaluation area that is obtained so as to correspond to the target location of evaluation based on a specified evaluation instruction file. As a result, a desired evaluation code may be written in a desired location, and the evaluation code may be rewritten without re-translation even when a target location or an evaluation item of evaluation is changed. Thus, an influence on normal execution of a program is suppressed, and even when a location or item to be evaluated is changed, evaluation of the program may be executed quickly and flexibly using the changed content.

In addition, when the size of an evaluation area to be obtained is set as the maximum size of an assumed evaluation code or more, any evaluation code may be written in any obtained evaluation area.

In addition, when an evaluation area is obtained after optimization for translation from a source code to a binary code, an influence of obtaining of the evaluation area on the optimization may be suppressed. In addition, even when one piece of loop processing at the source code level is converted into a plurality of pieces of loop processing at the binary code level due to the optimization, an evaluation area may be obtained for each of the plurality of pieces of loop processing.

In the above-described embodiment, the case is described in which a NOP instruction is arranged in a location that is obtained as an evaluation area, but the embodiment is not limited to such a case. For example, as an evaluation area, a free space may be obtained. In this case, a NOP instruction may be written in an area in which an evaluation code is not written in the writing unit 16, from among the free space that has been obtained as an evaluation area.

In addition, in the above-described embodiment, the case is described in which an evaluation area is obtained, and translation from a source code to a binary code is executed, but the embodiment is not limited to such a case. For example, after translation from the source code to the binary code is executed once, an evaluation area may be inserted into the binary code.

In addition, an instruction group that is written in an evaluation code is not limited to a case in which an execution time of a function or the number of loops is measured. For example, using "average value of values stored in a memory of a specified address" as an evaluation item, an evaluation code to output the average value may be written in an evaluation area that is obtained after a function to write a value in the address. For example, when such a value is related to the number of the loops, the number of loops may be used to determine whether tuning for a case in which the number of loops is large is executed, or tuning for a case in which the number of loops is small is executed.

In addition, in the above-described embodiment, a case is described in which the performance evaluation program generation program 50 is stored (installed) in the storage unit 46 beforehand, but may be distributed so as to recorded to a storage medium such as a compact disc-read-only memory (CD-ROM) and a digital versatile disc-read-only memory (DVD-ROM).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A device for generating a performance evaluation program comprising:
   a memory; and
   a processor coupled to the memory and configured to:
      analyze a source code of a target program that is subject to performance evaluation,
      detect, from among a plurality of areas included in the source code, a plurality of evaluation areas corresponding to a plurality of candidates of a target location where a performance evaluation of the target program is executed, based on an analysis result of the source code, the plurality of candidates including one or more loop processings,
      secure the plurality of evaluation areas by writing a no-operation (NOP) instruction to each of the plurality of evaluation areas detected from the plurality of areas, the NOP instruction indicating an instruction to proceed to an execution of a next instruction without any execution,
      generate an execution binary by translating the source code including the written NOP instruction into a binary code,
      generate a location information file indicating a correspondence relationship between an address and an insertion location for each of the plurality of secured evaluation areas, and
      replace the NOP operation stored in an evaluation area corresponding to the target location among the plurality of secured evaluation areas included in the execution binary with an evaluation code based on an evaluation item and the target location of the target program, according to the location information file,
   wherein the location information file includes a condition under which a loop processing is executed, for each of one or more evaluation areas related to the loop processing among the plurality of secured evaluation areas, the condition being a type of the loop processing which is based on a number of times of the loop processing.

2. The device according to claim 1, wherein the processor is configured to secure the plurality of evaluation areas respectively having a size equal to or larger than that of an assumed maximum evaluation code.

3. The device according to claim 1, wherein the processor is configured to:
execute optimization of the source code for translation of the source code into the binary code performed in the analysis of the source code, and
secure the plurality of evaluation areas after the optimization.

4. The device according to claim 3, wherein the processor is configured to secure the plurality of evaluation areas in a location that corresponds to each of a plurality of pieces of loop processing when the loop processing that is a candidate of the target location of the performance evaluation is converted into the plurality of pieces of the loop processing as a result of the optimization.

5. The device according to claim 1, wherein the processor is configured to write the evaluation code that corresponds to a changed evaluation item in the plurality of evaluation areas that are obtained to correspond to a changed target location to be used in performance evaluation, when the evaluation item and the target location of the performance evaluation are changed.

6. A method of generating a performance evaluation program, the method comprising:
analyzing a source code of a target program that is subject to performance evaluation;
detecting, from among a plurality of areas included in the source code, a plurality of evaluation areas corresponding to a plurality of candidates of a target location where a performance evaluation of the target program is executed, based on an analysis result of the source code, the plurality of candidates including one or more loop processings;
securing the plurality of evaluation areas by writing a no-operation (NOP) instruction to each of the plurality of evaluation areas detected from the plurality of areas, the NOP instruction indicating an instruction to proceed to an execution of a next instruction without any execution;
generating an execution binary by translating the source code including the written NOP instruction into a binary code;
generating a location information file indicating a correspondence relationship between an address and an insertion location for each of the plurality of secured evaluation areas; and
replacing the NOP operation stored in an evaluation area corresponding to the target location among the plurality of secured evaluation areas included in the execution binary with an evaluation code based on an evaluation item and the target location of the target program, according to the location information file,
wherein the location information file includes a condition under which a loop processing is executed, for each of one or more evaluation areas related to the loop processing among the plurality of secured evaluation areas, the condition being a type of the loop processing which is based on a number of times of the loop processing.

7. The method according to claim 6, further comprising securing the plurality of evaluation areas respectively having a size equal to or larger than that of an assumed maximum evaluation code.

8. The method according to claim 6,
executing optimization of the source code for translation of the source code into the binary code performed in the analysis of the source code, and
wherein the securing includes securing the plurality of evaluation areas after the optimization.

9. The method according to claim 8,
wherein the securing includes securing the plurality of evaluation areas in a location that corresponds to each of a plurality of pieces of loop processing when the loop processing that is a candidate of the target location of the performance evaluation is converted into the plurality of pieces of the loop processing as a result of the optimization.

10. The method according to claim 6,
wherein the writing writes the evaluation code that corresponds to a changed evaluation item in the plurality of evaluation areas that are obtained to correspond to a changed target location to be used in performance evaluation, when the evaluation item and the target location of the performance evaluation are changed.

11. A non-transitory computer-readable recording medium storing a program that causes a computer execute a process, the computer generating a performance evaluation program, the process comprising:
analyzing a source code of a target program that is subject to performance evaluation;
detecting, from among a plurality of areas included in the source code, a plurality of evaluation areas corresponding to a plurality of candidates of a target location where a performance evaluation of the target program is executed, based on an analysis result of the source code, the plurality of candidates including one or more loop processings;
securing the plurality of evaluation areas by writing a no-operation (NOP) instruction to each of the plurality of evaluation areas detected from the plurality of areas, the NOP instruction indicating an instruction to proceed to an execution of a next instruction without any execution;
generating an execution binary by translating the source code including the written NOP instruction into a binary;
generating a location information file indicating a correspondence relationship between an address and an insertion location for each of the plurality of secured evaluation areas; and
replacing the NOP operation stored in an evaluation area corresponding to the target location among the plurality of secured evaluation areas included in the execution binary with an evaluation code based on an evaluation item and the target location of the target program, according to the location information file,
wherein the location information file includes a condition under which a loop processing is executed, for each of one or more evaluation areas related to the loop processing among the plurality of secured evaluation areas, the condition being a type of the loop processing which is based on a number of times of the loop processing.

12. The non-transitory computer-readable recording medium according to claim 11, the process further comprising
   securing the plurality of evaluation areas respectively having a size equal to or larger than that of an assumed maximum evaluation code.

13. The non-transitory computer-readable recording medium according to claim 11,
   wherein the process further comprises executing optimization of the source code for translation of the source code into the binary code performed in the analysis of the source code, and
   wherein the securing includes securing the plurality of evaluation areas after the optimization.

14. The non-transitory computer-readable recording medium according to claim 13,
   wherein the securing includes securing the plurality of evaluation areas in a location that corresponds to each of a plurality of pieces of loop processing when the loop processing that is a candidate of the target location of the performance evaluation is converted into the plurality of pieces of the loop processing as the result of the optimization.

15. The non-transitory computer-readable recording medium according to claim 11,
   wherein the writing writes the evaluation code that corresponds to a changed evaluation item in the plurality of evaluation areas that are secured to correspond to a changed target location to be used in performance evaluation, when the evaluation item and the target location of the performance evaluation are changed.

16. The device according to claim 1,
   wherein the processor is configured to write a plurality of NOP instructions to each of the plurality of evaluation areas, a number of the plurality of NOP instructions being determined based on a size of an evaluation area to which the plurality of NOP instructions are written.

17. The device according to claim 1,
   wherein each of the plurality of evaluation areas is located before a candidate of the target location or after the candidate of the target location, each location of the plurality of evaluation areas being determined in accordance with the evaluation item.

18. The method according to claim 6,
   wherein the replacing includes writing a plurality of NOP instructions to each of the plurality of evaluation areas, a number of the plurality of NOP instructions being determined based on a size of an evaluation area to which the plurality of NOP instructions are written.

19. The method according to claim 6,
   wherein each of the plurality of evaluation areas is located before a candidate of the target location or after the candidate of the target location, each location of the plurality of evaluation areas being determined in accordance with the evaluation item.

20. The non-transitory computer-readable recording medium according to claim 11,
   wherein the replacing includes writing a plurality of NOP instructions to each of the plurality of evaluation areas, a number of the plurality of NOP instructions being determined based on a size of an evaluation area to which the plurality of NOP instructions are written.

* * * * *